(12) United States Patent
Kuivamäki

(10) Patent No.: US 6,877,594 B2
(45) Date of Patent: Apr. 12, 2005

(54) DISC BRAKE TO BE OPENED BY TORQUE

(75) Inventor: Ismo Kuivamäki, Hyvinkää (FI)

(73) Assignee: KCI Konecranes PLC, Hyvinkaa (FI)

( * ) Notice: Subject to any disclaimer, the term of this patent is extended or adjusted under 35 U.S.C. 154(b) by 0 days.

(21) Appl. No.: 10/115,953

(22) Filed: Apr. 5, 2002

(65) Prior Publication Data

US 2002/0144868 A1 Oct. 10, 2002

(30) Foreign Application Priority Data

Apr. 5, 2001 (FI) .............................. 20010714

(51) Int. Cl.⁷ ......................... F16D 55/02; F16D 55/36; B60T 8/72
(52) U.S. Cl. .................. 192/18 R; 188/71.2; 188/71.5; 188/181 T; 188/189
(58) Field of Search ............................ 192/223.3, 18 R, 192/56.6; 464/46; 254/350; 188/71.2, 71.3, 71.5, 72.3, 72.7, 73.31, 73.46, 162, 181 T, 189

(56) References Cited

U.S. PATENT DOCUMENTS

| | | | |
|---|---|---|---|
| 3,536,169 A | * | 10/1970 | Arnold ..................... 188/82.1 |
| 4,348,011 A | * | 9/1982 | Honda ....................... 254/350 |
| 4,502,667 A | | 3/1985 | Nakamura |
| 4,690,379 A | | 9/1987 | Nakamura |
| 5,533,712 A | * | 7/1996 | Fujikawa et al. ........... 254/362 |
| 6,209,690 B1 | * | 4/2001 | Kuivamaki et al. ......... 188/187 |
| 6,352,140 B1 | * | 3/2002 | Kuivamaki ................ 188/72.7 |

FOREIGN PATENT DOCUMENTS

| | | |
|---|---|---|
| DE | 40 08 757 C1 | 6/1991 |
| DE | 197 26 656 C1 | 12/1998 |
| EP | 1 092 888 A1 | 4/2001 |
| FI | 19992194 | 10/1999 |
| JP | 54072840 A * | 6/1979 |

* cited by examiner

*Primary Examiner*—Xuan Lan Nguyen
(74) *Attorney, Agent, or Firm*—Birch, Stewart, Kolasch & Birch, LLP

(57) ABSTRACT

A disc brake to be opened by torque is arranged between a drive shaft and a driven shaft and comprising a brake wheel arrangement arranged between the drive shaft and the driven shaft, a friction surface arrangement arranged to co-operate with the brake wheel arrangement, at least one spring device arranged to press the brake wheel arrangement and the friction surface arrangement axially against each other, and a cam arranged between the drive shaft and the brake wheel arrangement, and the cam causing by the impact of the torque or rotation of the drive shaft and the possible countertorque of the driven shaft the relative axial position between the brake wheel arrangement and the friction surface arrangement to change in order to detach at least partly the braking engagement against the spring force caused by the spring device.

12 Claims, 3 Drawing Sheets

DISC BRAKE TO BE OPENED BY TORQUE

BACKGROUND OF THE INVENTION

The invention relates to a disc brake to be opened by torque arranged between a drive shaft and a driven shaft and comprising a brake wheel arrangement arranged between the drive shaft and the driven shaft, a friction surface arrangement arranged to co-operate with the brake wheel arrangement, at least one spring device arranged to press the brake wheel arrangement and the friction surface arrangement axially against each other, and cam means arranged between the drive shaft and the brake wheel arrangement, the cam means causing by the impact of the torque or rotation of the drive shaft and the possible countertorque of the driven shaft the relative axial position between the brake wheel arrangement and the friction surface arrangement to change in order to detach at least partly the braking engagement against the spring force caused by the spring device.

A known disc brake to be opened by torque is described, for instance, in DE patent publication 197 26 656. Here, the brake is opened using a complicated mechanical arrangement. Also in other corresponding structures the implementations are mechanically difficult and at the same time problematic, and therefore the most conventional way to engage and disengage the brake has been to use electromagnetic actuators.

The type of brake described above is disclosed in FI patent application 992194. Here, the drive shaft and the driven shaft are interconnected so as to be able to rotate a restricted rotational angle in relation to each other, and the means for causing the axial displacements and for detaching the braking engagement comprise cam means arranged between the brake wheel arrangement and the driven shaft. In comparison with electromagnetic brakes, an advantage of the brake of the invention primarily consists in that losses generally experienced as a drawback, such as frictional couplings of a driven device (for example the resistance to motion of a carriage to be transferred in connection with transfer gear), are utilized for opening the brake. Always when the driven device includes a sufficient amount of countertorque, the brake may open. The brake always opens, because, when the actuator (such as a squirrel-cage induction motor) is started, it has to overcome the brake torque that it experiences as countertorque. As no separate magnet is required for the brake to operate, the brake voltage in electromotor applications need not be arranged in accordance with the motor voltage, which is a considerably advantage. No rectifier is either required. The opening force of the brake does not depend on the wear of the friction surface, wherefore the brake does not have to be adjusted. The wear margin of the brake depends on the geometry of the cam elements.

Another device, especially a squirrel-cage induction motor, utilizing the cam surface arrangements is disclosed in DE patent publication 40 08 757, in which the presented structure is, however, extremely complicated and includes a large number of parts. However, here the disconnection and connection of the device is electrically controlled using microswitches, wherefore a mechanically operating solution is not concerned.

It is an object of the present invention, however, to improve the solution known from FI patent application 992194 described above so that the torques arriving particularly from the direction of the load could be managed more adequately than before without causing any safety risks. Also the acceleration of the motor caused by the pendulous motion of the load above the synchronized speed should be avoided. It is also desirable that the applications of the brake could be widened from those applied only to electric motors.

BRIEF DESCRIPTION OF THE INVENTION

The objects set are achieved with a brake according to the invention, mainly characterized in that the brake wheel arrangement includes a first brake wheel non-rotatably but axially movingly arranged to the driven shaft, and a second brake wheel axially movingly arranged between the first brake wheel and the drive shaft and co-axially with the first brake wheel, while the spring device affects the first brake wheel, the friction surface arrangement includes a first set of friction surface means arranged between the first and second brake wheel, and a second set of friction surface means arranged between the second brake wheel and a fixed body, whereby the frictional coupling between the first and second brake wheel is smaller than the frictional coupling between the second brake wheel and the fixed body, and the cam means include a first cam part, which is mechanically controlled by the drive shaft, and a second cam part, which is non-rotatably arranged to the second brake wheel.

The invention is based on the idea to use two brake wheels, in which case the brake torques provided by said wheels are adjusted to be different. This enables to easily tailor the brake for various purposes and to provide the brake with additional properties that have previously required specific arrangements.

In addition to electric motor applications, the brake according to the invention can be used, for example, as load brakes arranged in lifting gears of a crane.

When the brake is mounted to an electric motor, such as a traversing motor of a hoisting apparatus, an electric motor rotor, a first cam part, a second cam part and a second brake wheel are arranged sequentially to the drive shaft and in such a manner that the rotor and the first cam part are un-rotatable and axially immovable, whereas the second cam part and the second brake wheel are axially movable.

If the brake is mounted as a load brake inside a lifting gear, the first cam part, the second cam part and the second brake wheel are journalled to the driven shaft in such a manner that the first cam part is axially immovable and the second cam part and the second brake wheel are axially movable, whereby the first cam part is provided with a transmission element that is in drive engagement with the drive shaft. Thus, the drive shaft and the driven shaft are typically located in parallel at a distance from one another and the transmission element is a cogwheel arranged between the two.

The brake according to the invention may also provide a torque restricting function by limiting the axial motion of the brake wheel arrangement to be minimal in the direction of the spring, in which case the spring force and thereby also the brake torque of the first brake wheel increase only slightly. This may provide considerably advantage in both exemplary applications mentioned above.

The details of the invention and the advantages achieved thereby are described in greater detail in the following description of the preferred embodiments.

BRIEF DESCRIPTION OF THE DRAWINGS

In the following the invention will be described in more detail by means of the referred embodiments with reference to the accompanying drawings, which are given by way of illustration only, and thus are not limitative of the present invention, and in which.

DETAILED DESCRIPTION OF THE INVENTION

Figure 1:
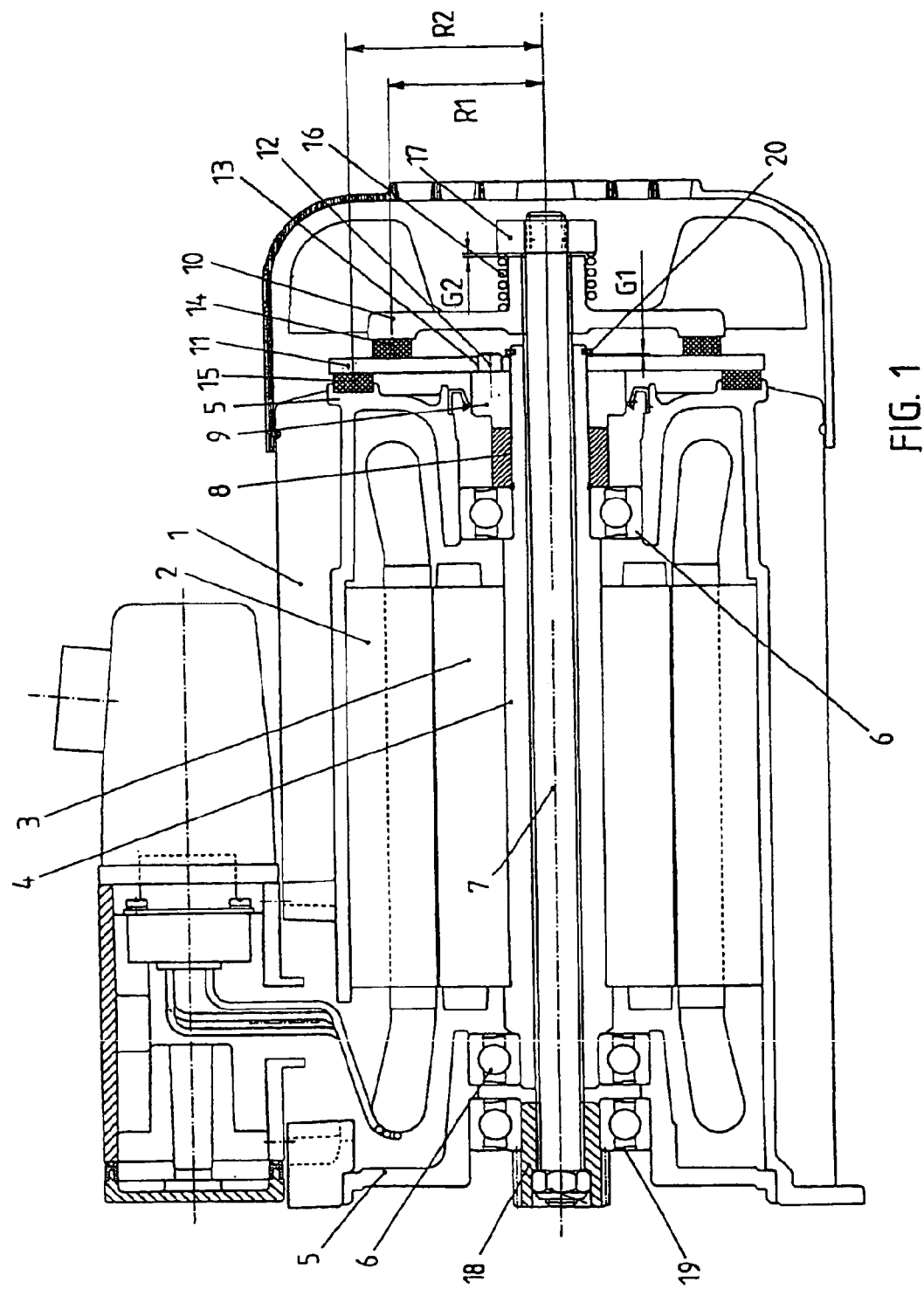
FIG. 1 shows a brake according to the invention in connection with an electric motor.

With reference to FIG. 1, a brake construction according to the invention is shown connected to an electric motor. A traversing motor of a hoisting apparatus may for instance be concerned. The structure of the motor/brake combination is the following:

A stator frame 1 contains a stator packet 2 that creates a magnetizing force that provides torque to a rotor 3 arranged inside the stator 2. The rotor 3 is torque locked, i.e. non-rotatably and also axially immovably mounted on a shaft 4 of the motor in at least one direction. The shaft 4 is journalled with bearings 6 from both ends thereof to a body 5 of the motor. A second shaft 7 that the shaft 4 is able to employ is provided through the shaft 4. In order to implement such a use, a first cam part 8 is fastened to the motor shaft 4 in the same torque locked fashion as the rotor 3 and a second cam part 9 that co-operates with the first cam part 8 and is loosely located on the shaft 4 so that it can both rotate and move axially on the shaft 4.

The cam parts 8 and 9 are in turn arranged to co-operate with a brake wheel arrangement 10, 11. The brake wheel arrangement comprises a first brake wheel 10 non-rotatably but axially movingly arranged to the driven shaft 7 described above, and a second brake wheel 11 mounted on the shaft 4 of the motor adjacent to the second cam part 9 to move in the same way as the second cam part 9 for which purpose the second cam part 9 includes pins 12 that are fastened to the corresponding openings 13 of the second brake wheel 11.

A friction surface arrangement 14, 15 is also arranged to co-operate with the pair of brake wheels 10 and 11, the arrangement comprising a first set of friction surface means 14, such as a friction wheel or a friction pad, mounted between the first and second brake wheel 10 and 11, and a second set of friction surface means 15, such as a friction wheel or friction pads, arranged between the second brake wheel 11 and the body 5.

The frictional couplings between the pair of brake wheels 10 and 11 and the frictional surface means 14 and 15 are dimensioned such that the frictional coupling between the second friction wheel 11 and the second set of friction surface means 15 exceeds the frictional coupling between the first brake wheel 10 and the first set of friction surface means 14. This is implemented in such a manner that the mean diameter R2 of the second set of friction means 15 is greater than the mean diameter R1 of the first set of friction surface means 14 (while the diameter of the second brake wheel 11 is greater than the diameter of the first brake wheel 10). Naturally this can be implemented so that the above-mentioned means 10, 11, 14, 15 have equally sized diameters, if the friction surface of the second set of friction surface means 15 and/or the friction coefficient thereof exceed those of the first set of friction surface means 14.

A compression spring 16 is mounted at the side of the first end of the driven shaft 7, meaning the end of the brake wheel pair 10, 11, the compression spring being pressed by means of a set-nut 17 fastened at the end of the driven shaft 7 against the first brake wheel 10 and thus presses the brake wheels 10 and 11 and the friction surface means 14, 15 axially against one another. The power output 18 of the driven shaft 7 is located at the second end of the shaft 7, which is journalled to the body 5 with a bearing 19.

In the exemplary implementation shown in FIG. 1, a thrust ring 20 is also arranged to the shaft 4 of the rotor adjacent to the second brake wheel 11 at a determined distance therefrom in order to restrict the axial motion of the second brake wheel 11. On the thrust ring 20 the axial motion of the brake wheel arrangement is restricted to be minor in the direction of the spring, in which case the spring force and thereby the torque decelerating the brake wheel 10 increases only slightly. Thus, the torque advancing from the motor to the driven shaft 7 may be only slightly more considerable than in a braking situation. Such a limitation of the torque protects the apparatus to be used.

The motor/brake combination described above operates as follows:

In FIG. 1, the brake is closed, meaning that it decelerates the driven shaft 7. When current is turned on for the motor, it starts providing torque to the shaft 4, which in turn rotates the first cam part 8 in relation to the second cam part 9. As the surfaces of the cam parts 8 and 9 facing one another are provided with pitches, the rotation provides the axial motion of the second cam part 9. This axial motion pushes the brake wheels 10 and 11 against the brake spring 16, until a gap G1 between the second brake wheel 11 and the thrust ring 20 is closed. When the thrust ring 20 is used the motor/brake combination operates as a torque restrictor, meaning that only a part of the torque provided by the motor is transferred to the actuator (for instance transmission gear). The torque that is forwarded to the actuator (not shown) when the gap G1 is closed, is a function of the force of the spring 16, the friction coefficient and mean diameter R1 of the friction means 15. When a traversing motor is concerned, the torque to be transferred can be selected so as to be enough to accelerate the load in question to a desired transfer speed at a reasonable time. The fact that the torque is reduced to a determined value saves the gear, since a pole change squirrel-cage induction motor in particular may provide high torque peaks. If the thrust 20 is removed, a gap G2 that is larger than the gap G1 between the brake wheel 10 and the set-nut 17 can be closed, and the apparatus does no longer include the afore-mentioned torque restrictor; instead the entire torque provided by the motor is transferred to the driven shaft 7.

When the current is turned off from the motor, the spring 16 presses the brake wheels 10, 11 and the friction surface means 14, 15 axially against one another (to the left in the Figure), whereby the brake is activated and stops the rotation of the driven shaft 7. Since the torque of the brake wheel 10 is smaller than the torque of the brake wheel 11, the torque arriving from the direction of the load or the driven shaft 7, cannot rotate the brake wheel 11, but a possible slip occurs between the first and the second brake wheel 10 and 11. Therefore, torque is not created either between the cam parts 8 and 9, which could open the brake under the impact of the torque arriving from the direction of the load. This can be considered as a safety feature that significantly increases the possible applications of the invention.

For example, in the transfer drives of a crane, which are mainly constructed as inverter drives, the invention provides the following additional feature: If the traversing motor is provided with a conventional electromagnetic brake, the pendulous motion of the load makes the motor accelerate above the synchronized speed, in which case the motor operates as a generator and feeds back the power. Such a power is generally driven to the brake resistances. If in turn the traversing motor is provided with a brake according to the invention, the brake activates immediately when the motor reaches a synchronized speed and cannot accelerate above the speed pulled by the load. Consequently, as the load pulls, the torque disappears between the cam parts 8 and 9 and the brake is closed. No brake resistances are therefore required. The invention operates equally well between an inverter motor and a pole change motor.

Figure 2:
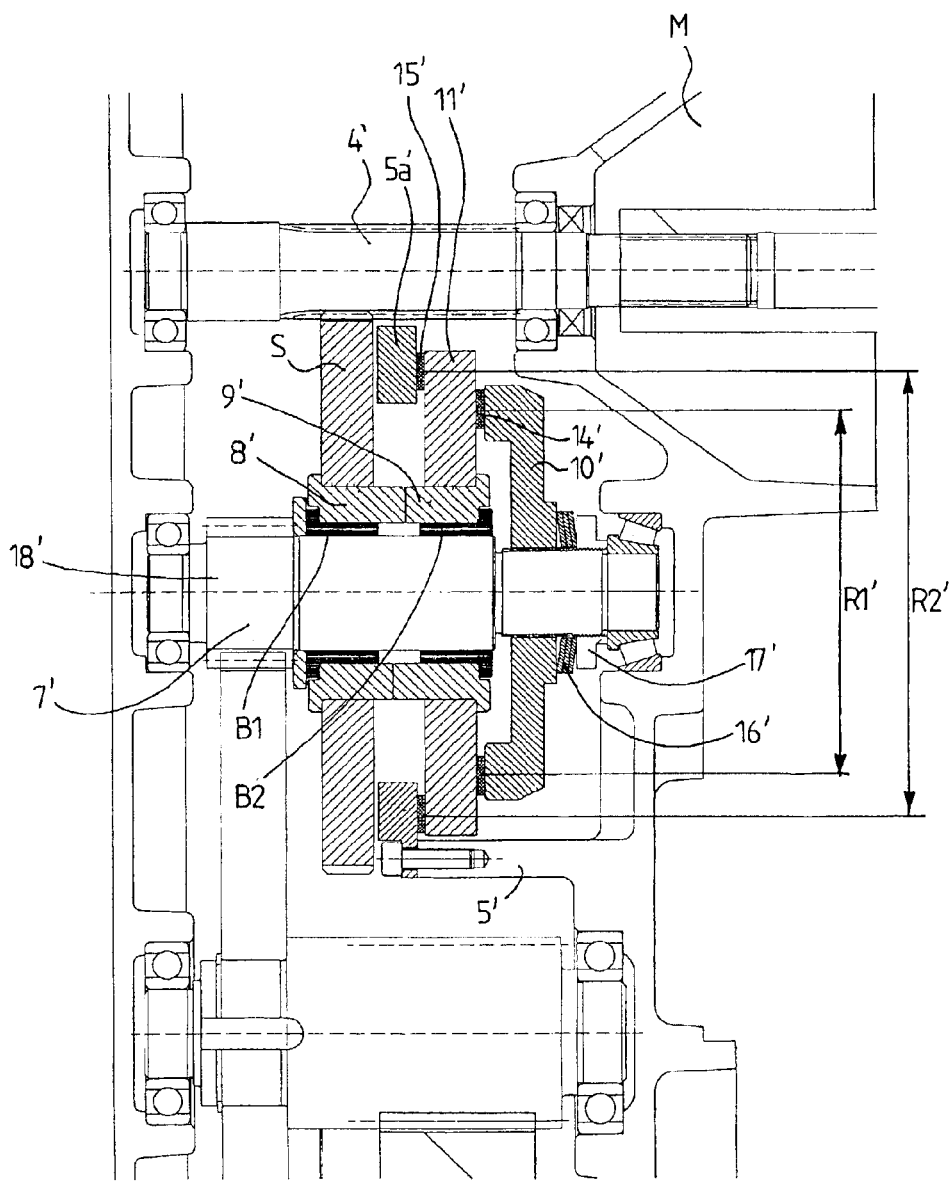
FIG. 2 shows the brake according to the invention in connection with a lifting gear.

In FIG. 2, the brake construction according to the invention is built inside the lifting gear. Reference numeral 4' is used to indicate the input shaft (driven shaft) of the gear that a motor M rotates. The input shaft 4' is in drive engagement with a secondary wheel S, for which it provides torque. The secondary wheel S is fastened by torque locking to a first cam part 8', which is journalled on the secondary shaft 7' (driven shaft) of the gear with a bearing B1.

A brake wheel arrangement 10', 11' is mounted on the secondary shaft 7', a first brake wheel 10' in the arrangement being non-rotatably but axially movingly arranged directly to the secondary shaft 7', whereas a second brake wheel 11' located between the first brake wheel 10' and the secondary wheel S is tightly fastened to a second cam part 9' that is journalled with a bearing B2 on the secondary shaft 7' and that co-operates with the first cam part 8'.

A friction surface arrangement 14', 15' is arranged to co-operate with the brake wheel pair 10' and 11' and comprises a first set of friction surface means 14', such as a friction wheel or a friction pad, mounted between the first and the second brake wheel 10' and 11', and a second set of friction surface means 15', such as a friction wheel or friction pads, arranged between the second brake wheel 11' and a body stop 5a' fastened to the body 5' of the gear.

The frictional couplings between the brake wheel pair 10' and 11' and the friction surface means 14' and 15' are dimensioned such that the frictional coupling between the second friction wheel 11' and the second set of friction surface means 15' exceeds the frictional coupling between the first brake wheel 10' and the first set of friction surface means 14'. This is implemented as shown in FIG. 1 in such a manner that a mean diameter R2' of the second set of friction surface means 15' is larger than the mean diameter R1 of the first friction surface means 14'. The alternative implementations described in FIG. 1 are naturally also possible in this case.

A set of springs 16' is mounted at the side of the first end of the secondary shaft 7', i.e. at the end of the brake wheel pair 10', 11', the set of springs being pressed at the end of the shaft 7' for example by means of a thrust ring 17' fastened using threads against the first brake wheel 10', thus pressing the brake wheels 11', 12' and the friction surface means 14', 15' axially against each other.

The lifting gear/brake system described in FIG. 2 operates as follows:

When a hook (not shown) associated with the lifting gear holds a load (not shown), it provides torque through the gear steps of the gear to the shaft 7' from the second end 18' thereof, whereby the first brake wheel 10' is also subjected to the torque caused by the load and tends to rotate. However, as the set of springs 16' also presses the second brake wheel 11' against the second set of friction surface means 15', the second brake wheel 11' is also subjected to the torque in question. Since the mean diameter R1' of the friction surface means 14' is smaller than the torque mean diameter R2' of the friction surface means 15', the torque decelerating the wheel 11' is larger than the torque decelerating the wheel 10'. A possible slip therefore occurs between the wheel 10' and the friction surface means 14' and the torque caused by the load cannot open the brake using the axial force caused by the proportional rotation of the cam parts 8' and 9'. When current is turned on again in the motor M, it starts providing torque between the cam parts 8' and 9'. The torque causes a proportional rotation between the cam parts 8' and 9' that opens the set of brakes, whereby the load can be lifted without experiencing any resistance from the brake.

The above description tells us that the brake concerned is a so-called load brake. In comparison with previous load brake constructions, the above structure provides significant advantages. This new solution of the invention is considerably simpler and includes fewer parts. Another significant difference to prior art solutions is also that neither ratchet devices nor pre-tightening devices are required.

Figure 3:
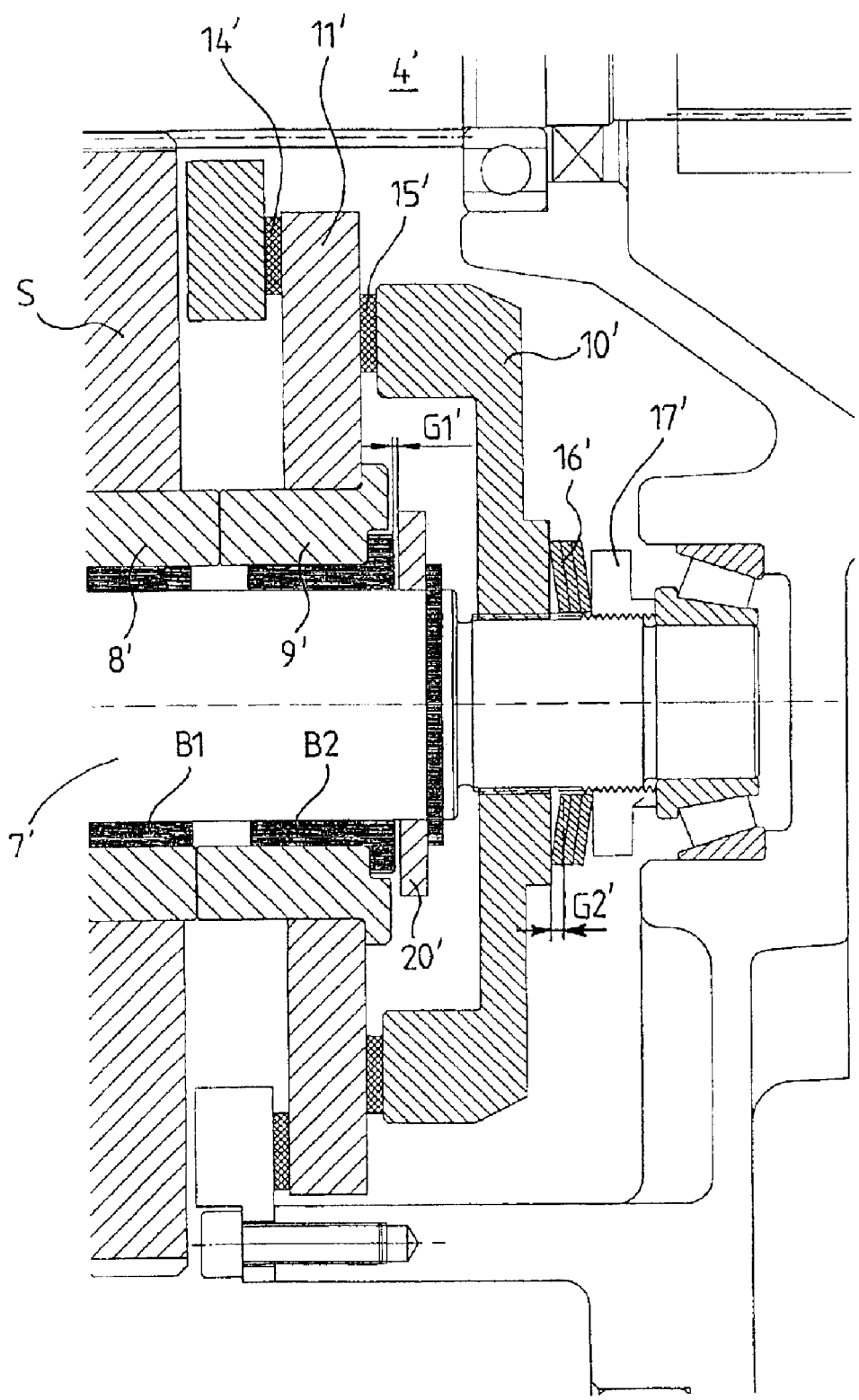
FIG. 3 shows a modified structure of FIG. 2.

In general, the problem with load brakes is an extensive heat production. This is caused by the fact that the parameters of the load brake are selected so that the load torque reduced to the load brake shaft provides the load brake with a torque that exceeds the size of the load torque 1.25 to 1.5 times. This means that when the load is lowered, not only the potential energy is transferred into heat, but up to 25 to 50% more. The construction shown in FIG. 3 shows a situation, in which only the potential energy of the load is transferred into heat. This is due to the fact that the lowering motion starts and the torque of the motor lightens the torque of the load brake until the torque of the brake is the same as the torque of the load and the load starts lowering under the impact of gravity. It is therefore reasonable to state that the brake construction according to FIG. 2 causes the gear a substantially smaller thermal strain than a conventional load brake construction. This is a valuable feature particularly in large-scale apparatuses, whose capacity to evaporate the created heat to the environment thereof is relatively inferior to the capacity of small-scale apparatuses (which is due to the fact that when the power of the apparatus increases, the volume of the apparatus also increases. The volume is a function of the third power of the dimensions, whereas the area evaporating heat is a function of the second power of the dimensions). A reduced thermal strain in turn extends the operating life of a lubricant in the gear system.

FIG. 3 shows the solution according to FIG. 2 except that a thrust ring 20' is mounted adjacent to the ensemble formed of the second cam part 9' and the second brake wheel 11' between the first and the second brake wheel 10', 11' to the secondary shaft 7', the thrust ring restricting the motion G1 of the second brake wheel 11' to be smaller than the motion G2 of the entire brake wheel pair 10', 11' against the set of springs 16'. Consequently the torque created between the first brake wheel 10' and the set of first friction surface means 14' is restricted. This provides such an advantage that only loads of such a size can be lifted, whose torque provided on the shaft 7' is smaller than or equals the size of the torque prevailing between the wheel 10' and the friction surface means 14'. The apparatus therefore operates also as a sliding clutch that may be connected to the load brake.

The above specification of the invention is only intended to illustrate the basic idea of the invention. However, a person skilled in the art may implement the invention and the details thereof in various ways within the scope of the attached claims.

What is claimed is:

1. A disc brake to be opened by torque arranged between a drive shaft and a driven shaft and comprising a brake wheel arrangement arranged between the drive shaft and the driven shaft, a friction surface arrangement arranged to co-operate with the brake wheel arrangement, at least one spring device arranged to press the brake wheel arrangement and the friction surface arrangement axially against each other, and cam means arranged between the drive shaft and the brake wheel arrangement, and the torque resulted by the rotation of the drive shaft causes the displacement between the brake wheel arrangement and the friction surface arrangement to change in order to detach at least partly the braking engagement against the spring force caused by the spring device, wherein, the brake wheel arrangement includes a first brake wheel non-rotatably but axially movingly arranged to the driven shaft, and a second brake wheel axially movingly arranged between the first brake wheel and the drive shaft and co-axially with the first brake wheel, while the spring device affects the first brake wheel, the friction surface arrangement includes a first set of friction surface means arranged between the first and second brake wheel, and a second set of friction surface means arranged between the second brake wheel and a fixed body, whereby the frictional coupling between the first and second brake wheel is smaller than the frictional coupling between the second brake wheel and the fixed body, and the cam means include a first cam part, which is mechanically controlled by the drive shaft, and a second cam part, which is non-rotatably arranged to the second brake wheel, wherein the brake is mounted in connection with an electric motor, whereby a rotor of the electric motor, the first cam part, the second cam part and the second brake wheel are arranged sequentially to the drive shaft and in such a manner that the rotor and the first cam part are non-rotatable and axially immovable, whereas the second cam part and the second brake wheel are axially moving, and wherein a thrust ring is arranged to the drive shaft adjacent to the second brake wheel at a determined distance therefrom in order to restrict the axial motion of the second brake wheel.

2. The disc brake as claimed in claim 1, wherein the axial motion of the second brake wheel is restricted to be smaller than the axial motion of the entire brake wheel arrangement against the spring device in order to achieve a torque restricting function.

3. The disc brake as claimed in claim 1 or 2, wherein the brake is mounted inside a lifting gear, whereby the first cam part, the second cam part and the second brake wheel are journalled to the driven shaft in such a manner that the first cam part is axially immovable and the second cam part and the second brake wheel are axially movable, whereby the first cam part is provided with a transmission element that is in drive engagement with the drive shaft.

4. The disc brake as claimed in claim 3, wherein the drive and driven shaft are located in parallel at a distance from one another and the transmission element is a cogwheel arranged between the two.

5. The disc brake as claimed in claim 3, wherein the thrust ring is arranged to the driven shaft between the first and second brake wheel in order to restrict the axial motion of the second brake wheel.

6. The disc brake as claimed in claim 1, wherein the electric motor is a traversing motor of a hoisting apparatus.

7. A disc brake to be opened by torque arranged between a drive shaft and a driven shaft and comprising a brake wheel arrangement arranged between the drive shaft and the driven shaft, a friction surface arrangement arranged to co-operate with the brake wheel arrangement, at least one spring device arranged to press the brake wheel arrangement and the friction surface arrangement axially against each other, and cam means arranged between the drive shaft and the brake wheel arrangement, and the torque resulted by the rotation of the drive shaft causes the displacement between the brake wheel arrangement and the friction surface arrangement to change in order to detach at least partly the braking engagement against the spring force caused by the spring device, wherein, the brake wheel arrangement includes a first brake wheel non-rotatably but axially movingly arranged to the driven shaft, and a second brake wheel axially movingly arranged between the first brake wheel and the drive shaft and co-axially with the first brake wheel, while the spring device affects the first brake wheel, the friction surface arrangement includes a first set of friction surface means arranged between the first and second brake wheel, and a second set of friction surface means arranged between the second brake wheel and a fixed body, whereby the frictional coupling between the first and second brake wheel is smaller than the frictional coupling between the second brake wheel and the fixed body, and the cam means include a first cam part, which is mechanically controlled by the drive shaft, and a second cam part, which is non-rotatably arranged to the second brake wheel, wherein the brake is mounted inside a lifting gear, whereby the first cam part, the second cam part and the second brake wheel are journalled to the driven shaft in such a manner that the first cam part is axially immovable and the second cam part and the second brake wheel are axially movable, whereby the first cam part is provided with a transmission element that is in drive engagement with the drive shaft, and wherein a thrust ring is arranged to the driven shaft between the first and second brake wheel in order to restrict the axial motion of the second brake wheel.

8. The disc brake as claimed in claim 7, wherein the axial motion of the second brake wheel is restricted to be smaller than the axial motion of the entire brake wheel arrangement against the spring device in order to achieve a torque restricting function.

9. The disc brake as claimed in claim 7 or 8, wherein the brake is mounted in connection with an electric motor, whereby a rotor of the electric motor, the first cam part, the second cam part and the second brake wheel are arranged sequentially to the drive shaft and in such a manner that the rotor and the first cam part are non-rotatable and axially immovable, whereas the second cam part and the second brake wheel are axially moving.

10. The disc brake as claimed in claim 11, wherein the thrust ring is arranged to the drive shaft adjacent to the second brake wheel at a determined distance therefrom in order to restrict the axial motion of the second brake wheel.

11. The disc brake as claimed in claim 7, wherein the drive and driven shaft are located in parallel at a distance from one another and the transmission element is a cogwheel arranged between the two.

12. The disc brake as claimed in claim 11, wherein the electric motor is a traversing motor of a hoisting apparatus.

* * * * *